United States Patent
Zhang et al.

(10) Patent No.: US 12,262,364 B2
(45) Date of Patent: Mar. 25, 2025

(54) RESOURCE DETERMINATION METHOD, RESOURCE SCHEDULING METHOD AND APPARATUSES THEREOF

(71) Applicant: FUJITSU LIMITED, Kawasaki (JP)

(72) Inventors: Guoyu Zhang, Beijing (CN); Qinyan Jiang, Beijing (CN); Tsuyoshi Shimomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 660 days.

(21) Appl. No.: 17/506,167

(22) Filed: Oct. 20, 2021

(65) Prior Publication Data
US 2022/0039105 A1    Feb. 3, 2022

Related U.S. Application Data

(63) Continuation of application No. PCT/CN2019/085316, filed on Apr. 30, 2019.

(51) Int. Cl.
| | |
|---|---|
| H04W 72/12 | (2023.01) |
| H04W 16/14 | (2009.01) |
| H04W 72/23 | (2023.01) |

(52) U.S. Cl.
CPC ........... *H04W 72/12* (2013.01); *H04W 16/14* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,660,095 | B1 * | 5/2020 | Marupaduga | H04W 72/20 |
| 11,647,462 | B2 * | 5/2023 | Lin | H04W 52/0274 |
| | | | | 370/311 |
| 11,864,232 | B2 * | 1/2024 | Moon | H04W 74/0866 |
| 2007/0015462 | A1 * | 1/2007 | Dean | H04B 7/15557 |
| | | | | 455/15 |

(Continued)

FOREIGN PATENT DOCUMENTS

| | | |
|---|---|---|
| CN | 107113083 A | 8/2017 |
| CN | 109156006 A | 1/2019 |

(Continued)

OTHER PUBLICATIONS

International Search Report and Written Opinion of the International Searching Authority issued by the China National Intellectual Property Administration for corresponding International Patent Application No. PCT/CN2019/085316, mailed on Feb. 5, 2020, with an English translation.

Examination Report issued by the Patent Office of India for corresponding Indian Patent Application No. 202137047227, dated Jan. 31, 2023, with an English translation.

(Continued)

*Primary Examiner* — Otis L Thompson, Jr.
(74) *Attorney, Agent, or Firm* — Myers Wolin, LLC

(57) ABSTRACT

A resource determination method, a resource scheduling method and apparatuses thereof. The method includes: receiving, by a terminal equipment, indication information transmitted by a network device, and receiving resource scheduling information transmitted by the network device, the indication information being used to determine whether a spacing bandwidth resource belongs to a scheduling bandwidth resource; and determining a size of a transport block according to the indication information and the resource scheduling information.

19 Claims, 8 Drawing Sheets

(56) References Cited

U.S. PATENT DOCUMENTS

| | | | |
|---|---|---|---|
| 2009/0147735 A1* | 6/2009 | Ghosh | H04W 8/30 370/329 |
| 2009/0232071 A1* | 9/2009 | Cho | H04L 5/0044 370/329 |
| 2011/0090808 A1* | 4/2011 | Chen | H04W 28/18 370/252 |
| 2014/0064067 A1* | 3/2014 | Drewes | H04L 5/0044 370/329 |
| 2014/0254509 A1* | 9/2014 | Chen | H04L 5/0058 370/329 |
| 2015/0085794 A1 | 3/2015 | Chen et al. | |
| 2016/0095104 A1* | 3/2016 | Chen | H04W 72/23 370/329 |
| 2016/0095118 A1* | 3/2016 | Mizusawa | H04J 11/00 455/452.2 |
| 2016/0095137 A1 | 3/2016 | Chen et al. | |
| 2017/0181182 A1* | 6/2017 | Patel | H04L 5/0048 |
| 2017/0332387 A1 | 11/2017 | Zhang et al. | |
| 2018/0048511 A1 | 2/2018 | Hakola et al. | |
| 2018/0176904 A1 | 6/2018 | Yerramalli et al. | |
| 2018/0184429 A1 | 6/2018 | Gan et al. | |
| 2019/0239198 A1* | 8/2019 | Zhang | H04L 5/0007 |
| 2019/0322299 A1* | 10/2019 | Mong | B61L 15/0072 |
| 2019/0357219 A1* | 11/2019 | Wong | H04W 72/21 |
| 2020/0045733 A1* | 2/2020 | Tiirola | H04W 74/0808 |
| 2020/0059961 A1* | 2/2020 | Do | H04W 74/0808 |
| 2020/0213902 A1 | 7/2020 | Xing et al. | |
| 2020/0236710 A1* | 7/2020 | Sun | H04L 5/0016 |
| 2020/0412813 A1* | 12/2020 | Mong | B61L 27/04 |

FOREIGN PATENT DOCUMENTS

| | | | | |
|---|---|---|---|---|
| CN | 109392100 A | 2/2019 | | |
| EP | 3 664 544 A1 | 6/2020 | | |
| JP | 2018-501722 A | 1/2018 | | |
| JP | 2018-524898 A | 8/2018 | | |
| JP | 2021-510483 A | 4/2021 | | |
| WO | WO-2006092852 A1 * | 9/2006 | | H04L 27/2602 |
| WO | 2019/137777 A1 | 7/2019 | | |

OTHER PUBLICATIONS

First Notification of Office Action and Search Report issued by the China National Intellectual Property Administration for corresponding Chinese Patent Application No. 201980095486.2, mailed on Jun. 29, 2023, with an English translation.

Vivo, "Discussion on wideband operation in NR-U", Agenda Item: 7.2.2.2.5, 3GPP TSG-RAN WG1 Meeting #96bis, R1-1904069, Xi'an, China, Apr. 8-12, 2019.

Intel Corporation, "Wideband operation for NR-unlicensed", Agenda Item: 7.2.2.2.5, 3GPP TSG-RAN WG1 Meeting #96bis, R1-1904289, Xi'an, China, Apr. 8-12, 2019.

Notice of Reasons for Refusal issued by the Japan Patent Office for corresponding Japanese Patent Application No. 2021-564406, mailed on Nov. 29, 2022, with an English translation.

Nokia et al., "On wideband operation in NR-U", Agenda Item: 7.2.2.2.5, 3GPP TSG-RAN WG1 Meeting #96, R1-1902437, Athens, Greece, Feb. 25-Mar. 1, 2019.

Intel Corporation, "UL signals and channels for NR-unlicensed", Agenda Item: 7.2.2.1.3, 3GPP TSG-RAN WG1 Meeting #96, R1-1904284, Xi'an, China, Apr. 8-12, 2019.

Communication pursuant to Article 94(3) EPC issued by the European Patent Office for corresponding European Patent Application No. 19 927 461.4, mailed on Mar. 20, 2024.

Extended European Search Report with the supplementary European search report and European search opinion issued by the European Patent Office for corresponding European Patent Application No. 19927461.4-1215, mailed on Apr. 13, 2022.

Notice of Preliminary Rejection issued by the Korean Intellectual Property Office for corresponding Korean Patent Application No. 10-2021-7034315, mailed on Jul. 18, 2024, with an English translation.

Nokia et al., "On wideband operation in NR-U", Agenda Item: 7.2.2.2.5, 3GPP TSG-RAN WG1 Meeting #96bis, R1-1904194, Xi'an, China, Apr. 8-12, 2019.

Ericsson, "Frame structure for NR-U", Agenda Item: 7.2.2.2, 3GPP TSG-RAN WG1 Meeting #94bis, R1-1811298, Chengdu, China, Oct. 8-12, 2018.

* cited by examiner

RESOURCE DETERMINATION METHOD, RESOURCE SCHEDULING METHOD AND APPARATUSES THEREOF

CROSS-REFERENCE TO RELATED APPLICATION

This application is a continuation application of International Application PCT/CN2019/085316 filed on Apr. 30, 2019 and designated the U.S., the entire contents of which are incorporated herein by reference

TECHNICAL FIELD

This disclosure relates to the field of communication technologies.

BACKGROUND

In enhanced licensed assisted access (eLAA) of the Long Term Evolution (LTE), an uplink transmission mechanism for unlicensed frequency bands is introduced. In order to meet requirements of occupied channel bandwidth (OCB) and power spectrum density (PSD), Interlace is adopted in the eLAA as a basic unit of uplink transmission resource allocation.

FIG. 1 is an exemplary diagram of an Interlace structure in a 20 MHz bandwidth in LTE. For example, an Interlace consists of 10 resource blocks (RBs), and these 10 resource blocks are equally spaced in the 20 MHz bandwidth. For example, the Interlace 0 consists of RB0, RB10, RB20, RB90.

A network device (such as a base station) may allocate one or more Interlaces to a terminal equipment via uplink scheduling signaling for uplink data transmission of the terminal equipment. In addition, data transmission of the eLAA is performed under a framework of carrier aggregation, that is, the terminal equipment first accesses to a network device via a licensed frequency band, and then the network device allocates carriers of unlicensed frequency bands to the terminal equipment, each carrier needing scheduling control signaling to schedule transmission on the carrier.

In Rel.15 of New Radio (NR), a unit of uplink and downlink resource allocation is a resource block group (RBG). According to the number of resource blocks contained in a carrier bandwidth, the number of resource blocks contained in the resource block group may be determined, in a range of {2, 4, 8, 16}; and according to a frequency domain position of a bandwidth part (BWP) in the carrier, the number of RBGs included in the bandwidth part may be obtained through calculation.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in performing resource allocation and scheduling, understandings of whether some resources (such as spacing bandwidth resources) are schedulable of a network device and a terminal equipment may possibly be different. Therefore, a consensus on spectrum resources cannot be reached, and resource utilization cannot be effectively improved.

Addressed to at least one of the above problems, embodiments of this disclosure provide a resource determination method, a resource scheduling method and apparatuses thereof.

According to a first aspect of the embodiments of this disclosure, there is provided a resource determination method, including:

receiving, by a terminal equipment, indication information transmitted by a network device, the indication information being used to determine whether a spacing bandwidth resource belongs to a scheduling bandwidth resource;

receiving, by the terminal equipment, resource scheduling information transmitted by the network device; and determining a size of a transport block by the terminal equipment according to the indication information and the resource scheduling information.

According to a second aspect of the embodiments of this disclosure, there is provided a resource determination apparatus, including:

a receiving portion configured to receive indication information transmitted by a network device, and receive resource scheduling information transmitted by the network device, the indication information being used to determine whether a spacing bandwidth resource belongs to a scheduling bandwidth resource; and a determining portion configured to determine a size of a transport block according to the indication information and the resource scheduling information.

According to a third aspect of the embodiments of this disclosure, there is provided a resource scheduling method, including:

transmitting indication information by a network device to a terminal equipment, the indication information being used by the terminal equipment to determine whether a spacing bandwidth resource belongs to a scheduling bandwidth resource; and transmitting resource scheduling information to the terminal equipment, the indication information and the resource scheduling information being at least used by the terminal equipment to determine a size of a transport block.

According to a fourth aspect of the embodiments of this disclosure, there is provided a resource scheduling apparatus, including:

a transmitting portion configured to transmit indication information to a terminal equipment, the indication information being used by the terminal equipment to determine whether a spacing bandwidth resource belongs to a scheduling bandwidth resource, the transmitting portion further transmitting resource scheduling information to the terminal equipment, and the indication information and the resource scheduling information being at least used by the terminal equipment to determine a size of a transport block.

According to a fifth aspect of the embodiments of this disclosure, there is provided a communication system, including:

a terminal equipment configured to receive indication information transmitted by a network device, the indication information being used to determine whether a spacing bandwidth resource belongs to a scheduling bandwidth resource; receive resource scheduling information transmitted by the network device; and determine a size of a transport block according to the indication information and the resource scheduling information; and the network device configured to transmit the indication information and the resource scheduling information to the terminal equipment.

An advantage of the embodiments of this disclosure exists in that the terminal equipment receives the indication information transmitted by the network device, and receives the resource scheduling information transmitted by the network device, the indication information being used to determine whether a spacing bandwidth resource belongs to a scheduling bandwidth resource; and determines a size of a transport block according to the indication information and the resource scheduling information. Hence, the network device and the terminal equipment may reach a consensus on spectrum resources, and resource utilization may be effectively improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
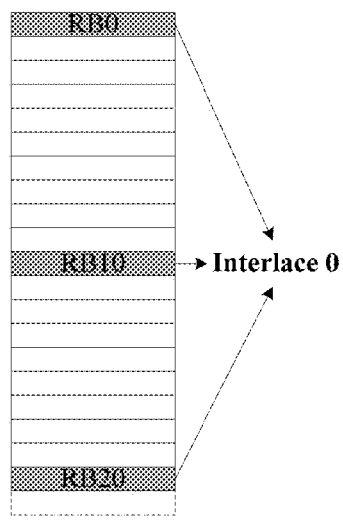
FIG. 1 is an exemplary diagram of a structure of an Interlace in a bandwidth of 20 MHZ in LTE.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In addition, the term "network side" or "network device side" refers to one side of the network, which may be a certain base station, and may also include one or more network devices as described above. The term "user side" or "terminal side" or "terminal equipment side" refers to a side of a user or a terminal, which may be a certain UE, and may also include one or more terminal equipments as described above.

Scenarios in the embodiments of this disclosure shall be described below by way of examples; however, this disclosure is not limited thereto.

Figure 2:
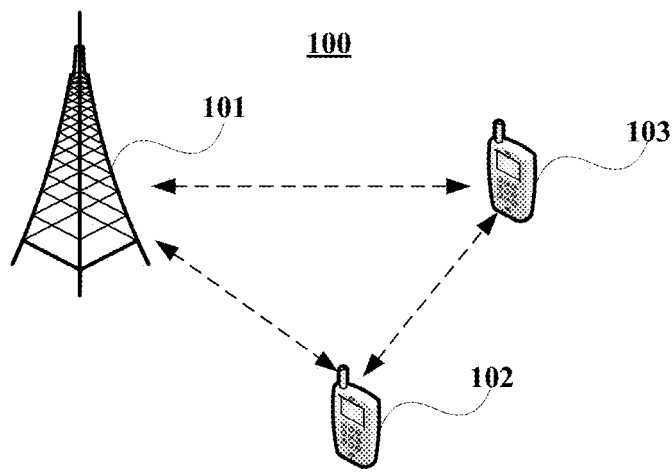
FIG. 2 is a schematic diagram of a communication system of an embodiment of this disclosure.

FIG. 2 is a schematic diagram of a communication system of an embodiment of this disclosure, in which a case where a terminal equipment and a network device are taken as examples is schematically shown. As shown in FIG. 2, a communication system 100 may include a network device 101 and terminal equipments 102, 103. For the sake of simplicity, an example having only two terminal equipments and one network device is schematically given in FIG. 2; however, the embodiment of this disclosure is not limited thereto.

In an embodiment of this disclosure, existing traffics or traffics that may be implemented in the future may be performed between the network device 101 and the terminal equipments 102, 103. For example, such traffics may include but not limited to enhanced mobile broadband (eMBB), massive machine type communication (MTC), and ultra-reliable and low-latency communication (URLLC), etc.

It should be noted that FIG. 2 shows that two terminal equipments 102 and 103 are both within the coverage of the network device 101; however, the embodiment of this disclosure is not limited thereto. The two terminal equipments 102 and 103 may not be within the coverage of the network device 101, or one terminal equipment 102 is within the coverage of the network device 101 and the other terminal equipment 103 is outside the coverage of the network device 101.

Figure 3:
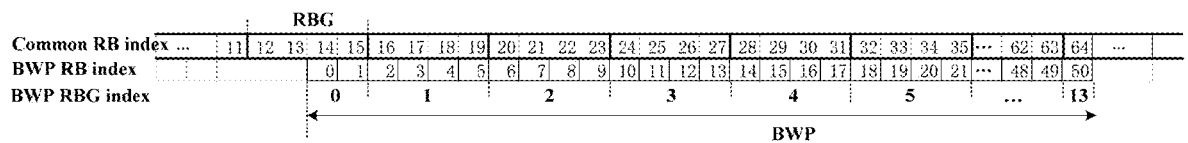
FIG. 3 is an exemplary diagram of a BWP in NR Rel.15.

FIG. 3 is an exemplary diagram of a BWP in NR Rel.15. As shown in FIG. 3, in a carrier with a resource block group size of 4 RBs, a bandwidth part includes 51 RBs from common RB 14 to common RB 64, hence, the bandwidth part includes total 14 resource block groups. Wherein, a first resource block group (RBG 0) includes 2 RBs, a last resource block group (RBG 13) includes 1 RB, and other resource block groups include 4 RBs.

In NR Rel.15, two uplink and downlink resource allocation modes (mode 0 and mode 1) are included. Mode 0 indicates an RBG scheduling condition in the bandwidth part (BWP) via a bitmap, and mode 1 indicates a starting RBG and the number of RBGs in multiple scheduled consecutive RBGs via a resource indication value (MV).

In the 90bis meeting of 3GPP RAN4, an agreement was made on that NR-based access to unlicensed spectrum supports a single carrier frequency with a bandwidth of more than 20 MHz (a bandwidth of a single carrier frequency includes multiple channel idle detection bandwidth units).

In using an unlicensed spectrum to transmit data, in order to avoid interference, a transmitting device needs to perform channel idle detection, and only when a frequency band where data to be transmitted are located is detected as being in an idle state (that is, there exists no other devices occupying this spectrum to transmit data), can the transmitting device transmit the data in this frequency band; otherwise, the transmitting device cannot use this frequency spectrum to transmit data. The channel idle detection bandwidth unit is, for example, a frequency-domain unit for channel idle detection when the transmitting device uses unlicensed spectrum to transmit data, which may be, for example, 20 MHz, or may be an integer multiple of 20 MHz.

Figure 4:
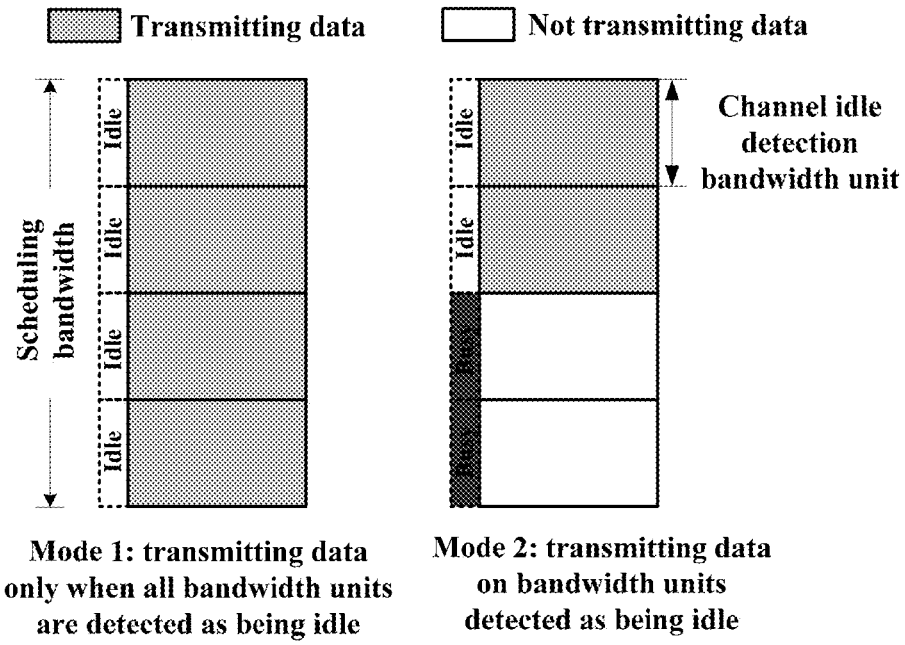
FIG. 4 is a schematic diagram of a channel idle detection bandwidth unit.

FIG. 4 is a schematic diagram of the channel idle detection bandwidth unit. Large-bandwidth transmission exceeding 20 MHz of a single carrier frequency bandwidth may include two modes. As shown in FIG. 4, when mode 1 is use, the scheduling bandwidth transmits data only when channels of channel idle detection bandwidth units scheduling data transmission are detected as being idle; and when mode 2 is used, data may be transmitted on one or more bandwidth units with channels detected as being in an idle state. For example, if only a part of the channel idle detection bandwidth units are detected as being in an idle state, the data are transmitted on these bandwidth units detected as being in an idle state.

As to the above two modes, in order to ensure that out-of-band radiation does not cause interference to adjacent frequency bands, it is needed to reserve spacing bandwidth (or also referred to as guard bandwidth) resources at both sides of a transmission bandwidth. And for method 2, as a bandwidth unit that may actually transmit data cannot be determined before the channel idle detection, spacing bandwidth resources need to be reserved at both sides of each bandwidth unit. However, understandings of whether these spacing bandwidth resources are schedulable of a network device and a terminal equipment may possibly be different.

Therefore, a consensus on spectrum resources cannot be reached, and resource utilization cannot be effectively improved.

The embodiments of this disclosure shall be described below by taking resources of an unlicensed frequency band as an example. However, this disclosure is not limited thereto, for example, for resources of licensed frequency bands, the embodiments of this disclosure are still applicable.

Embodiment 1

Figure 5:
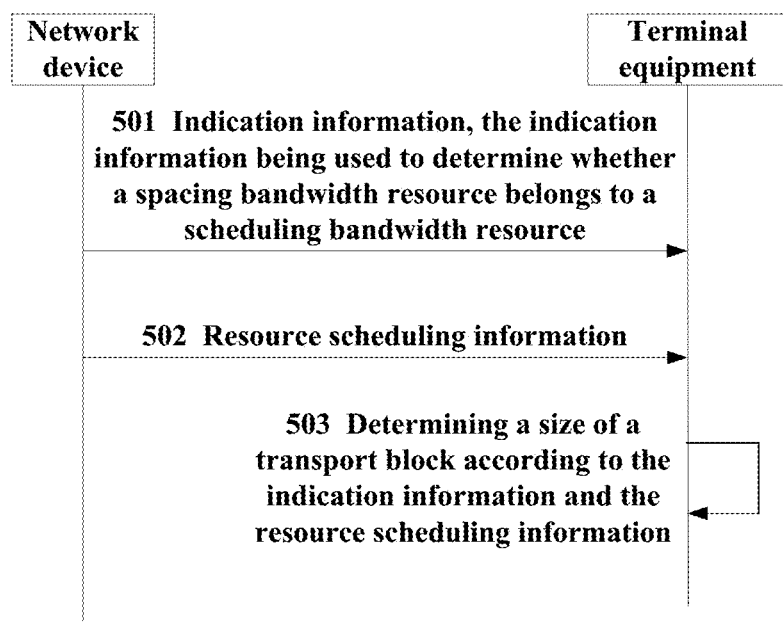
FIG. 5 is a schematic diagram of the resource determination method of an embodiment of this disclosure.

The embodiments of this disclosure provide a resource determination method, which shall be described from a terminal equipment side. FIG. 5 is a schematic diagram of the resource determination method of the embodiment of this disclosure. As shown in FIG. 5, the method includes:

501: a terminal equipment receives indication information transmitted by a network device, the indication information being used to determine whether a spacing bandwidth resource belongs to a scheduling bandwidth resource;

502: the terminal equipment receives resource scheduling information transmitted by the network device; and 503: the terminal equipment determines a size of a transport block according to the indication information and the resource scheduling information.

It should be noted that FIG. 5 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 5.

In an embodiment, the terminal equipment may also report capability information to the network device, the capability information at least indicating whether the terminal equipment has a capability to adjust a size of the scheduling bandwidth resource according to the channel idle detection result.

For example, in the above mode 2, the transmission bandwidth is adjusted immediately after the channel detection, which requires a processing capability of the UE. Therefore, in the capability information reported to the base station, the UE needs to include capability information on whether the UE supports that the scheduling bandwidth changes according to the channel idle detection result.

In an embodiment, the spacing bandwidth resource may be one or more resource units between at least two bandwidth units configured in a bandwidth part (BWP), or the spacing bandwidth resource may be one or more resource units other than at least one bandwidth unit configured in a bandwidth part (BWP). The resource unit may be one or more resource blocks (RBs), or one or more resource block groups (RBGs), or one or more subcarriers; however, this disclosure is not limited thereto.

Resource allocation shall be described below first. And at least one bandwidth unit is configured in the bandwidth part (BWP) configured for the terminal equipment (the following description shall be given by taking a subband as an example).

In an embodiment, the bandwidth part (BWP) is further configured with information indicating a starting resource block and the number of resource blocks of the BWP, and resource blocks in the BWP not belonging to the bandwidth unit are taken as spacing bandwidth resources.

For example, a starting common RB of the BWP and the number of common RBs contained therein are configured first, and then at least one bandwidth unit contained in the BWP is configured. RBs not belong to the bandwidth unit in the BWP may be taken as spacing bandwidth resources. Table 1 shows an example of a BWP information element (IE). As shown in Table 1, subband denotes a bandwidth unit, and locationAndBandwidth indicates the starting resource block and the number of resource blocks of the BWP.

TABLE 1

```
BWP ::=                    SEQUENCE {
    locationAndBandwidth       INTEGER (0..37949),
    subcarrierSpacing          SubcarrierSpacing,
    cyclicPrefix               ENUMERATED { extended }  OPTIONAL -- Need R
    subband                    SEQUENCE (SIZE (1..maxsubband)) OF Subband
}
```

In an embodiment, resource blocks included in one or more bandwidth units are taken as resource blocks of the BWP, and resource blocks out of the bandwidth units are used as spacing bandwidth resources.

For example, the common RBs included in the BWP are configured in configuration information of the BWP, and at least one bandwidth unit is configured, common RBs included in the at least one bandwidth unit in the configuration information being the RBs included in the BWP. Common RBs between two bandwidth units may be taken as spacing bandwidth resources. Table 2 shows another example of the BWP IE; as shown in Table 2, subband denotes a bandwidth unit.

TABLE 2

```
BWP ::=                    SEQUENCE {
    subband                    SEQUENCE (SIZE (1..maxsubband)) OF Subband
    subcarrierSpacing          SubcarrierSpacing,
    cyclicPrefix               ENUMERATED { extended }   OPTIONAL -- Need R
}
```

In an embodiment, configuration information of the spacing bandwidth resources is further contained in the configuration information of the BWP and is taken as optional configuration, and at least one configured bandwidth unit and/or the configured spacing bandwidth resources are taken as resources of the BWP.

For example, the common RBs included in the BWP are configured in the configuration information of the BWP, and in the configuration information of the BWP, in addition to at least one configured bandwidth unit, spacing bandwidth resources are further selected and configured, then, common RBs included in the at least one bandwidth unit and the spacing bandwidth are the RBs included in the BWP; and if at least one bandwidth unit is configured in the configuration information of the BWP and no spacing bandwidth resource is selected to be configured, the common RBs of the at least one bandwidth unit are the RBs included in the BWP. Table 3 shows a further example of the BWP IE; as shown in Table 3, subband denotes a bandwidth unit, and guardband denotes a spacing bandwidth.

TABLE 3

```
BWP ::=              SEQUENCE {
  subband            SEQUENCE (SIZE (1..maxsubband)) OF Subband
  guardband          SEQUENCE (SIZE (1..maxguardband)) OF Guardband
OPTIONAL
  subcarrierSpacing      SubcarrierSpacing,
  cyclicPrefix           ENUMERATED { extended }    OPTIONAL -- Need R
}
```

In an embodiment, the bandwidth unit is configured with information indicating the starting resource block and the number of resource blocks; or, the bandwidth unit is configured with information on the starting resource block. At least two bandwidth units configured in the bandwidth part (BWP) are able to include at least one identical resource block, or any two bandwidth units configured in the bandwidth part (BWP) do not include identical resource blocks.

For example, the starting common RB and the number of included common RBs may be configured, or one bandwidth unit includes at least one channel idle detection bandwidth unit, and the number of RBs included in one channel idle detection bandwidth unit being of a predefined value. The starting common RB and the number of channel idle detection bandwidth units contained in the bandwidth unit (i.e. the number of predefined values) may be configured. Table 4 shows still another example of the subband IE; as shown in Table 4, subband indicates a bandwidth unit, and locationAndBandwidth indicates the starting resource block and the number of resource blocks of the subband.

TABLE 4

```
Subband ::=              SEQUENCE {
  locationAndBandwidth     INTEGER (0..x),
}
```

Figure 6:
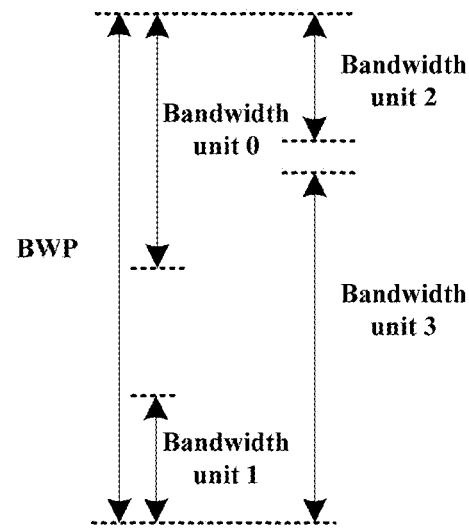
FIG. 6 is an exemplary diagram of a BWP and a bandwidth unit of the embodiment of this disclosure.

FIG. 6 is an exemplary diagram of the BWP and bandwidth unit of the embodiment of this disclosure. As shown in FIG. 6, sizes of the two bandwidth units configured in the BWP may be identical or different, and furthermore, the two bandwidth units may contain identical common RBs.

Figure 7:
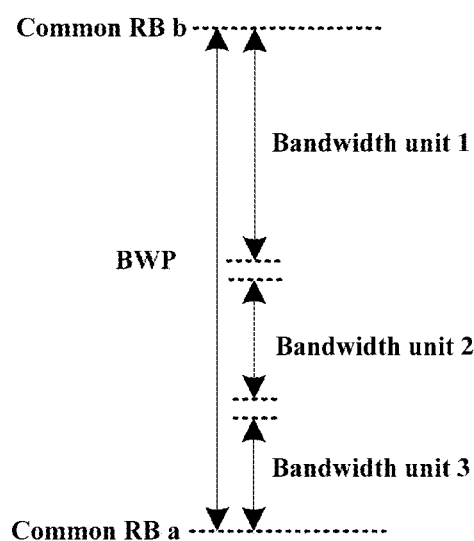
FIG. 7 is another exemplary diagram of the BWP and bandwidth unit of the embodiment of this disclosure.

FIG. 7 is another exemplary diagram of the BWP and bandwidth unit of the embodiment of this disclosure. As shown in FIG. 7, sizes of the two bandwidth units configured in the BWP may be identical or different, and furthermore, any two bandwidth units configured in the BWP do not contain identical common RBs.

For another example, the bandwidth unit is the channel idle detection bandwidth unit, the number of RBs contained in one channel idle detection bandwidth unit is of a predefined value, the configuration information of the bandwidth unit includes the starting RB of the bandwidth unit, and then a frequency-domain position of the bandwidth unit may be determined according to the predefined number of RBs. Table 5 shows yet another example of the subband IE; as shown in Table 5, subband indicates a bandwidth unit, and StartingRB indicates the starting resource block the subband.

TABLE 5

```
Subband ::=              SEQUENCE {
  StartingRB               INTEGER (0..x),
}
```

Figure 8:
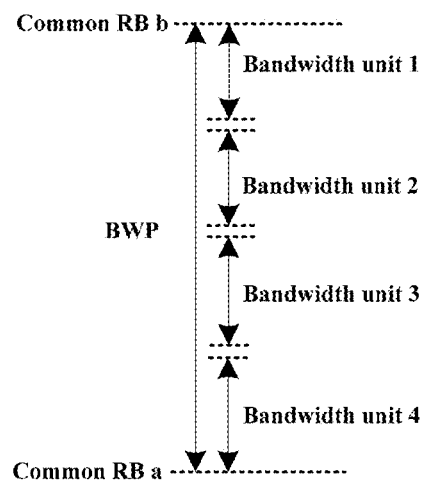
FIG. 8 is a further exemplary diagram of the BWP and bandwidth unit of the embodiment of this disclosure.

FIG. 8 is a further exemplary diagram of the BWP and bandwidth unit of the embodiment of this disclosure. As shown in Table 8, any two bandwidth units configured in the BWP do not contain identical common RBs, and sizes thereof are identical.

The resource allocation is schematically described above, and the resource scheduling unit shall be described below.

In an embodiment, multiple resource units with a frequency-domain spacing of a predetermined value in the bandwidth part (BWP) are divided into one resource scheduling unit.

Taking an uplink resource scheduling unit Interlace as an example, for example, a subcarrier cluster with a frequency-domain spacing of a predefined value in the bandwidth part belongs to an uplink resource scheduling unit (interlace); wherein the predefined value is the number of RBs or the number of subcarriers. The subcarrier cluster may be a resource block or a resource unit consisting of an integer number of subcarriers. The number of subcarriers included in the subcarrier cluster is a predefined value.

Figure 9:
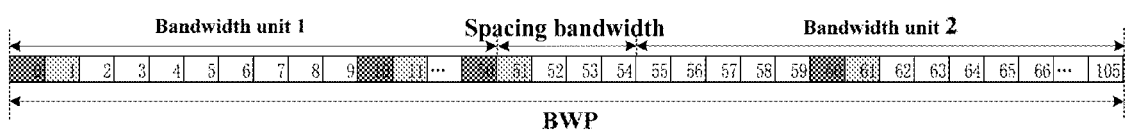
FIG. 9 is an exemplary diagram of Interlace division of the embodiment of this disclosure.

FIG. 9 is an exemplary diagram of Interlace division of the embodiment of this disclosure. As shown in FIG. 9, for example, the subcarrier cluster is an RB, and a predefined frequency-domain spacing value is 9. The bandwidth part contains 106 RBs with index values of 0, 1, . . . , 105, hence, RBs with a frequency-domain spacing of 9 belong to the same uplink resource scheduling unit, and the bandwidth part contains total 10 uplink resource scheduling units.

As shown in FIG. 9, for example, uplink resource scheduling unit 0 includes RB 0, RB 10, RB 20, . . . , RB 100, and uplink resource scheduling unit 1 includes RB 1, RB 11, RB 21, . . . , RB 101.

In another embodiment, at least one bandwidth unit in the bandwidth part (BWP) is divided into resource scheduling units respectively, and multiple resource units with a predetermined frequency-domain spacing in one bandwidth unit are divided into one resource scheduling unit.

Taking the above uplink resource scheduling unit Interlace as an example, for example, the bandwidth units in the bandwidth part are divided into uplink resource scheduling units, and subcarrier clusters with a frequency-domain spacing of a predefined value in the bandwidth units belong to an uplink resource scheduling unit.

Figure 10:
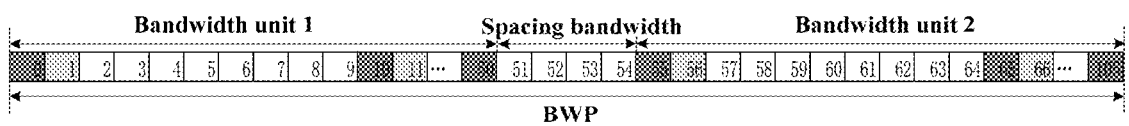
FIG. 10 is another exemplary diagram of Interlace division of the embodiment of this disclosure.

FIG. 10 is another exemplary diagram of Interlace division of the embodiment of this disclosure. As shown in FIG. 10, for example, a bandwidth part contains 106 RBs, wherein frequency-domain resources RB 0 to RB 50 are configured as bandwidth unit 1, frequency-domain resources RB 55 to RB 105 are configured as bandwidth unit 2, and frequency-domain resources RB 51 to RB 54 are spacing bandwidth resources.

As shown in FIG. 10, the subcarrier cluster is an RB, the predefined frequency-domain spacing value is 9, the uplink resource scheduling unit 0 in bandwidth unit 1 includes RB 0, RB 10, ... , RB 50, and the uplink resource scheduling unit 0 in bandwidth unit 2 includes RB 55, RB 65, RB 105; the uplink resource scheduling unit 1 in bandwidth unit 1 includes RB1, RB11, RB41, and the uplink resource scheduling unit 1 in bandwidth unit 2 includes RB 56, RB 66, ... , RB 96.

In addition, when the network device supports scheduling spacing bandwidth resources, the network device may configure the terminal equipment with an uplink resource scheduling unit to which resources in the spacing bandwidth resources belong. When the network device indicates that the spacing bandwidth resource is a schedulable resource, the terminal equipment deems that the spacing bandwidth resources belonging to the uplink resource scheduling unit scheduled by the network device are scheduled.

For example, the spacing bandwidth resource in FIG. 10 includes 4 RBs. The network equipment respectively configures the 4 RBs in the spacing bandwidth resource, which belong to uplink resource scheduling units 1, 2, 3 and 4 in an ascending order of index values, that is, RB 51 belongs to uplink resource scheduling unit 1, RB 52 belongs to uplink resource scheduling unit 2, RB 53 belongs to uplink resource scheduling unit 3, and RB 54 belongs to uplink resource scheduling unit 4.

When the network device indicates that a spacing bandwidth resource between bandwidth unit 1 and bandwidth unit 2 is a schedulable resource, if the network device schedules uplink resource scheduling unit 3, the terminal equipment deems that RB 53 in the spacing bandwidth resource is also scheduled at the same time, hence, a size of a transport block may be determined via a size of the scheduled resource.

When the network device transmits indication information for scheduling the terminal equipment to transmit uplink data to the terminal equipment, the terminal equipment may detect a channel idle state of the channel idle detection bandwidth unit where the scheduled resource is located before transmitting the uplink data. For example, the terminal equipment transmits the uplink data on the scheduled resource only when channel idle detection bandwidth units of all scheduled resources are in an idle state; otherwise, it does not transmit data on the scheduled resource.

Figure 11:
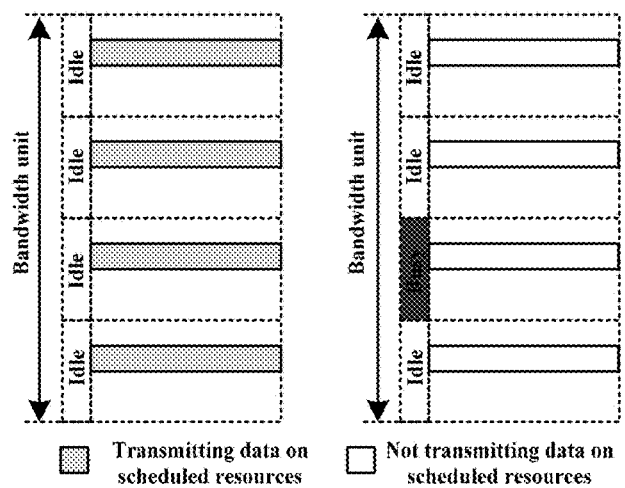
FIG. 11 is a schematic diagram of detecting the bandwidth unit of the embodiment of this disclosure.

FIG. 11 is a schematic diagram of detecting the bandwidth unit of the embodiment of this disclosure. As shown in FIG. 11, for example, if the channel idle detection bandwidth units in the bandwidth unit are all in an idle state, the terminal equipment transmits data on the scheduled resource; and if there exists at least one channel idle detection bandwidth unit in the bandwidth unit is not in an idle state (that is, in a busy state), the terminal equipment does not transmit data on the scheduled resource.

A resource scheduling mode shall be described below.

In an embodiment, a configured bandwidth unit may be activated by a network device via a media access control (MAC) control element (CE) or downlink control information (DCI), and an activated configured bandwidth unit is a scheduling bandwidth resource.

For example, in one time of scheduling, a base station only schedules a resource of one configured bandwidth unit for uplink data transmission. The base station activates one of multiple configured bandwidth units via MAC CE signaling, and the base station may only schedule resources in the activated bandwidth unit to transmit data.

For another example, the base station may indicate the scheduled bandwidth unit via an indication field in the DCI, the number of bits included in the indication field being determined by the number of bandwidth units configured in the BWP. For example, if 4 bandwidth units are configured in the BWP, the indication field in the DCI contains 2 bits, in which '00' indicates a bandwidth unit with an index value of 0, and '01' indicates a bandwidth unit with an index value of 1. Or, the number of bits contained in the indication field in the DCI is of a predefined value; for example, if the predefined value is 3, a maximum number of bandwidth units configured in the BWP is 8, and a value of the indication field may be one-to-one correspondence with index values of the configured bandwidth units in an ascending order, that is, '000' indicates a bandwidth unit with an index value of 0, '001' indicates a bandwidth unit with an index value of 1, and so on.

In another embodiment, at least one configured bandwidth unit may be activated by the network device via an MAC CE or downlink control information (DCI), and the activated at least one bandwidth unit is a scheduling bandwidth resource.

For example, in one time of scheduling, the base station schedules resources of at least one bandwidth unit to transmit data, and frequency-domain resources of any two scheduled bandwidth units do not overlap. The base station activates at least one bandwidth unit via the MAC CE signaling, and the base station schedules resources for transmitting data in the at least one activated bandwidth unit.

For another example, the base station indicates the scheduled bandwidth unit via an indication field in the DCI. The indication field may indicate a resource indication value (MV), that is, a starting position of resources and number of the resources are determined by the resource indication value in a triangular binary tree coding mode. The UE determines multiple scheduled consecutive bandwidth units according to the value of the indication field. The indication field may also be a bitmap, each bit in the bitmap corresponding to the configured bandwidth units one-to-one, and a length of the bitmap being of a predefined value, or the number of bits in the bitmap being equal to the number of bandwidth units configured in the bandwidth part.

In an embodiment, the resource scheduling information indicates at least one resource scheduling unit scheduled by the network device; wherein a resource belonging to the scheduling bandwidth resource in the at least one scheduled resource scheduling unit is used to determine a size of a transport block; or, a resource of the at least one resource scheduling unit overlapping the scheduling bandwidth resource is used to determine a size of a transport block.

For example, the UE deems that a spacing bandwidth resource between two adjacent bandwidth units scheduled by the base station is a schedulable resource, and if the spacing bandwidth resource contains a resource belonging to the uplink resource scheduling unit scheduled by the base station, the UE deems that a resource in the spacing bandwidth resource belonging to the uplink resource scheduling unit scheduled by the base station is scheduled. If a spacing bandwidth resource is not between two adjacent scheduled bandwidth units, that is, when a resource adjacent to the spacing bandwidth resource includes a bandwidth unit that is not scheduled by the base station, the resources scheduled by the base station do not include resources in the spacing bandwidth resource, the UE deems that the resources in the spacing bandwidth resource are not scheduled.

Figure 12:
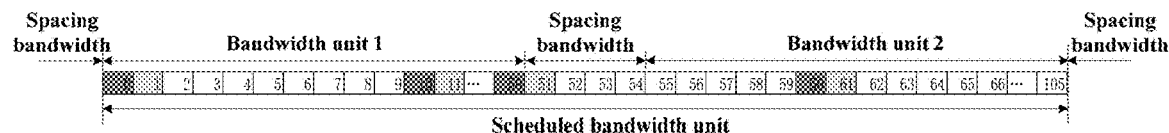
FIG. 12 is a schematic diagram of the bandwidth unit of the embodiment of this disclosure.

FIG. 12 is a schematic diagram of the bandwidth unit of the embodiment of this disclosure. As shown in FIG. 12, for example, the base station schedules uplink resource scheduling units 0 and 1 in bandwidth unit 1 and bandwidth unit 2 in the bandwidth part. As bandwidth unit 1 and bandwidth unit 2 are consecutive bandwidth units, the UE deems that the spacing bandwidth resources are schedulable resources, wherein resources (such as RB 51) belonging to uplink resource scheduling units 0 and 1 are also scheduled for transmitting uplink data. And if bandwidth unit 3 is not scheduled by the base station, resources in the spacing bandwidth resources between bandwidth units 2 and 3 belonging to uplink resource scheduling units 0 and 1 are not scheduled by the base station. Thus, the UE may determine sizes of the scheduled resources, thereby calculating the transport block size.

In an embodiment, the indication information may indicate the scheduling bandwidth resources, and the terminal equipment determines whether the spacing bandwidth resources belong to the scheduling bandwidth resources according to the scheduling bandwidth resource.

For example, if a system does not support flexible adjustment of the scheduling bandwidth resources, the UE may determine whether the spacing bandwidth is scheduled according to the bandwidth units contained in the scheduling bandwidth resources, and if the scheduled bandwidth resources include two adjacent bandwidth units, the UE deems that the spacing bandwidth between the two adjacent bandwidth units belongs to the scheduling bandwidth resources, and a resource in the scheduled uplink resource scheduling unit overlapping with the scheduling bandwidth resource is used to determine the transport block size. And when adjacent bandwidth units at both sides of a spacing bandwidth are not scheduled at the same time, the UE deems that the spacing bandwidth is not scheduled.

For another example, if the system does not support flexible adjustment of scheduling bandwidth resources and the base station activates at least one configured bandwidth unit and/or spacing bandwidth to be taken as a scheduling bandwidth resource via the MAC CE or downlink control information, a resource in the scheduled uplink resource scheduling unit overlapping with the scheduling bandwidth resource is used to determine the transport block size. That is, if the spacing bandwidth is activated by the MAC CE or downlink control information, it will be taken as a scheduling bandwidth resource, and if it is not activated, it will not be used as a scheduling bandwidth resource.

In an embodiment, the indication information indicates whether the network device and/or the terminal equipment use(s) a channel idle detection result to adjust the size of the scheduling bandwidth resource.

In an embodiment, the indication information may be transmitted via at least one of the following: radio resource control (RRC) signaling, a media access control (MAC) control element (CE), and downlink control information (DCI); however, this disclosure is not limited thereto.

For example, the base station and/or the UE may adopt scheduling bandwidth adaptation (that is, the size of the scheduling bandwidth resource may be adjusted according to the channel idle detection result). And the UE may determine according to the indication information of the base station whether one or more resources in the spacing bandwidth resource are scheduled.

In an embodiment, in a case where the indication information indicates that the network device and/or the terminal equipment do(es) not use the channel idle detection result to adjust the size of the scheduling bandwidth resource, the terminal equipment determines that a spacing bandwidth resource between two adjacent bandwidth units scheduled by the network device belongs to the scheduling bandwidth resource.

In an embodiment, when the indication information indicates that the network device and/or the terminal equipment use(s) the channel idle detection result to adjust the size of the scheduling bandwidth resource, the terminal equipment determines that the spacing bandwidth resource between two adjacent bandwidth units is not scheduled by the network device.

For example, if the base station does not support transmission or reception of scheduling bandwidth adaptation, the UE determines via the bandwidth unit scheduled by the base station whether the spacing bandwidth resource is a schedulable resource. The spacing bandwidth resource between two adjacent bandwidth units scheduled by the base station is a schedulable resource; otherwise, the spacing bandwidth resource is not scheduled by the base station.

For another example, the base station indicates whether the UE adopts transmission and/or reception of scheduling bandwidth adaptation. If the UE adopts scheduling bandwidth adaptation, the spacing bandwidth resource is not scheduled by the base station; and if the UE does not adopt scheduling bandwidth adaptation, the spacing bandwidth resource between two adjacent bandwidth units scheduled by the base station is a schedulable resource; otherwise, the spacing bandwidth resource is not scheduled by the base station.

The above description is given by taking the uplink resource scheduling unit Interlace as an example, and the following description shall be given by taking a downlink resource scheduling unit RBG as an example.

Figure 13:
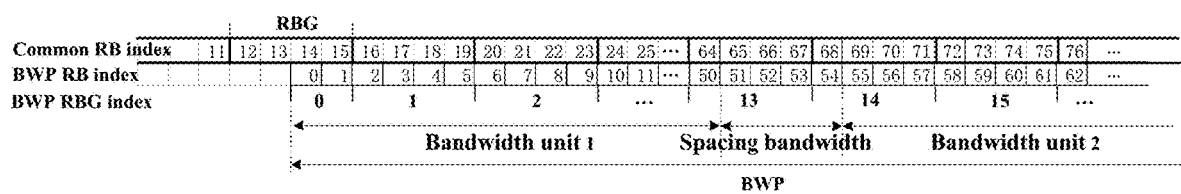
FIG. 13 is another exemplary diagram of the BWP of the embodiment of this disclosure.

FIG. 13 is another exemplary diagram of the BWP of the embodiment of this disclosure. As shown in FIG. 13, the number of RBGs included in a bandwidth part (BWP) may be used to calculate the number of RBGs in the downlink resource scheduling unit.

Figure 14:
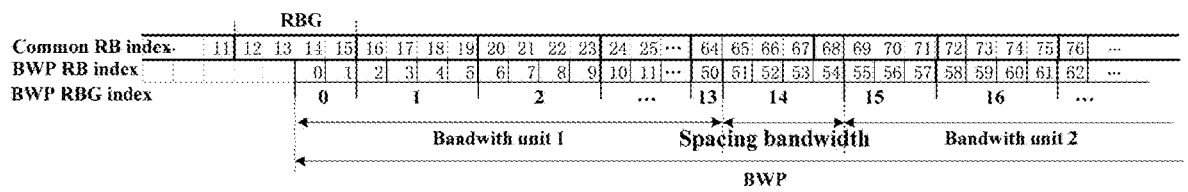
FIG. 14 is a further exemplary diagram of the BWP of the embodiment of this disclosure.

FIG. 14 is a further exemplary diagram of the BWP of the embodiment of this disclosure. As shown in FIG. 14, numbers of RBGs included in bandwidth units may be calculated respectively, a spacing bandwidth resource being taken as an RBG.

For example, the UE may determine according to the indication information of the base station whether the resource in the spacing bandwidth is scheduled. If the base station does not support downlink data transmission of scheduling bandwidth adaptation, the UE may determine via the bandwidth unit scheduled by the base station whether the spacing bandwidth is a schedulable resource.

For example, if the indication field of the downlink resource scheduling unit indicates that a downlink resource scheduling unit in two adjacent bandwidth units is scheduled and scheduling a downlink resource scheduling unit not shared with the spacing bandwidth is included, the UE deems that the spacing bandwidth is a schedulable bandwidth.

Taking FIG. 13 as an example, the UE receives the downlink resource scheduling unit transmitted by the base station, wherein the indication field indicates that RBG 0, RBG 1, RBG 13 and RBG 15 are scheduled, which includes RBG 0 and RBG 1 not shared with the spacing bandwidth in bandwidth unit 1 and RBG 15 not shared with the spacing bandwidth in bandwidth unit 2, the UE deems that a spacing bandwidth between bandwidth units 1 and 2 is a schedulable resource, wherein all RBs in RBG 13 scheduled by the base station are scheduled.

For another example, if a downlink resource scheduling unit in one of the two adjacent bandwidth units that is not shared with the spacing bandwidth is not scheduled, the UE deems the spacing bandwidth between the two adjacent bandwidth units is an unschedulable resource.

Still taking FIG. 13 as an example, the UE receives the downlink resource scheduling unit transmitted by the base station, its indication field indicates that RBGs 0-13 are scheduled, which includes RBG 0 to RBG 12 in bandwidth unit 1 that are not shared with the spacing bandwidth, but does not include an RBG in bandwidth unit 2 that is not shared with the spacing bandwidth, then the UE deems that the spacing bandwidth between bandwidth units 1 and 2 is an unschedulable resource. Therefore, RB 51 to RB 54 belonging to the spacing bandwidth in RBG 13 are not scheduled by the base station, and only an RB belonging to bandwidth unit 1 is scheduled.

For a further example, the indication field of the downlink resource scheduling unit may indicate the scheduled downlink resource scheduling unit via a bitmap. If a spacing bandwidth between two adjacent bandwidth units indicated in the indication field of the downlink resource scheduling unit is scheduled, the UE deems that the spacing bandwidth is an available resource. And if the spacing bandwidth between two adjacent bandwidth units indicated in the indication field of the downlink resource scheduling unit is not scheduled, the UE deems that the spacing bandwidth is an unschedulable resource.

For still another example, the indication field of the downlink resource scheduling unit may indicate the downlink resource scheduling unit by indicating a resource indication value (the resource indication value indicates a starting downlink resource scheduling unit and the number of the downlink resource scheduling units). If the indication field of the downlink resource scheduling unit indicates that downlink resource scheduling units in two adjacent bandwidth units are scheduled by the base station, the UE deems that the spacing bandwidth is an available resource. And if the downlink resource scheduling units indicated in the indication field of the downlink resource scheduling unit contains only a downlink resource scheduling unit of one bandwidth unit in two adjacent bandwidth units, the UE deems that the spacing bandwidth is an unschedulable resource.

For example, the base station may indicate via RRC or an MAC CE whether to adopt scheduling bandwidth adaptation. If it is indicated that the scheduling bandwidth adaptation is adopted, an indication range of the indication field of the downlink resource scheduling unit does not include a spacing bandwidth resource. If the bitmap indication mode is used, the number of bits contained in the bitmap may be equal to a sum of the number of RBGs contained in bandwidth units in the BWP; and if the resource indication value mode is used, the number of consecutive RBGs indicated by the resource indication value does not include a spacing bandwidth resource.

Figures 15, 16:
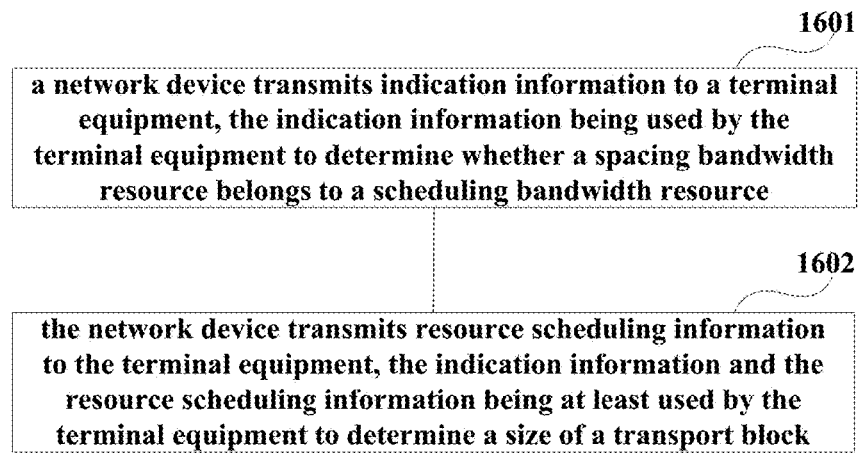
FIG. 15 is still another exemplary diagram of the BWP of the embodiment of this disclosure.
FIG. 16 is a schematic diagram of the resource scheduling method of an embodiment of this disclosure.

FIG. 15 is still another exemplary diagram of the BWP of the embodiment of this disclosure. As shown in FIG. 15, for example, if the base station schedules 4 RBGs starting from RBG 12, the scheduled RBGs are RBG 12, RBG 13, RBG 14 and RBG 15, which do not include RB 51 to RB 54 included in the spacing bandwidth.

For another example, the base station may indicate via DCI whether to adopt scheduling bandwidth adaptation. A total number/range of resource block groups indicated by the indication field of the downlink resource scheduling unit is/are a total number of resource block groups divided above (that is, a calculated total number of RBGs including the spacing bandwidth resources). If the DCI indicates to adopt scheduling bandwidth adaptation, the UE deems that the resources in the spacing bandwidth are not scheduled by the base station.

If the RRC signaling or MAC CE or DCI indicates that scheduling bandwidth adaptation is not used, it is identical to the above-described method in which the base station does not support scheduling bandwidth adaptation.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the indication information transmitted by the network device, and receives the resource scheduling information transmitted by the network device, the indication information being used to determine whether a spacing bandwidth resource belongs to a scheduling bandwidth resource; and determines a size of a transport block according to the indication information and the resource scheduling information. Hence, the network device and the terminal equipment may reach a consensus on spectrum resources, and resource utilization may be effectively improved.

Embodiment 2

The embodiments of this disclosure provide a resource scheduling method, which shall be described from a network device side, with contents identical to those in Embodiment 1 being not going to be described herein any further.

FIG. 16 is a schematic diagram of the resource scheduling method of the embodiment of this disclosure. As shown in FIG. 16, the method includes:

1601: a network device transmits indication information to a terminal equipment, the indication information being used by the terminal equipment to determine whether a spacing bandwidth resource belongs to a scheduling bandwidth resource; and

1602: the network device transmits resource scheduling information to the terminal equipment, the indication information and the resource scheduling information being at least used by the terminal equipment to determine a size of a transport block.

In an embodiment, the spacing bandwidth resource is one or more resource units between at least two bandwidth units configured in the bandwidth part (BWP), or the spacing bandwidth resource is one or more resource units outside at least one bandwidth unit configured in the bandwidth part (BWP).

In an embodiment, the indication information indicates the scheduling bandwidth resource, and the terminal equipment determines whether the spacing bandwidth resource belongs to the scheduling bandwidth resource according to the scheduling bandwidth resource.

In an embodiment, the indication information indicates whether the network device and/or the terminal equipment use(s) the channel idle detection result to adjust a size of the scheduling bandwidth resource.

In an embodiment, the indication information is transmitted via at least one of the following: radio resource control (RRC) signaling, a media access control (MAC) control element (CE), downlink control information (DCI).

In an embodiment, in a case where the indication information indicates that the network device and/or the terminal equipment do(es) not use the channel idle detection result to adjust the size of the scheduling bandwidth resource, the terminal equipment determines that the spacing bandwidth resource between two adjacent bandwidth units scheduled by the network device belongs to the scheduling bandwidth resource.

In an embodiment, when the indication information indicates that the network device and/or the terminal equipment use(s) the channel idle detection result to adjust the size of the scheduling bandwidth resource, the terminal equipment determines that the spacing bandwidth resource between two adjacent bandwidth units is not scheduled by the network device.

In an embodiment, the network device receives capability information reported by the terminal equipment, the capability information at least indicating whether the terminal equipment has a capability to adjust a size of the scheduling bandwidth resource according to the channel idle detection result.

In an embodiment, the bandwidth part (BWP) configured for the terminal equipment is configured with at least one bandwidth unit.

In an embodiment, the bandwidth part (BWP) is further configured with information indicating a starting resource block and the number of resource blocks of the BWP, and a resource block in the BWP not belonging to the bandwidth unit is taken as a spacing bandwidth resource.

In an embodiment, resource blocks included in the bandwidth unit are taken as resource blocks of the BWP, and resource blocks outside the bandwidth unit are taken as spacing bandwidth resources.

In an embodiment, the bandwidth unit is configured with information indicating the starting resource block and the number of resource blocks; or, the bandwidth unit is configured with information on the starting resource block.

In an embodiment, at least two bandwidth units configured in the bandwidth part (BWP) may include at least one identical resource block, or any two bandwidth units configured in the bandwidth part (BWP) do not include identical resource blocks.

In an embodiment, multiple resource units with a frequency-domain spacing of a predetermined value in the bandwidth part (BWP) are divided into one resource scheduling unit; or, at least one bandwidth unit in the bandwidth part (BWP) is divided into resource scheduling units, respectively, and multiple resource units with a frequency-domain spacing of a predetermined value in a bandwidth unit are divided into one resource scheduling unit.

In an embodiment, the resource unit is one or more resource blocks, or one or more resource block groups, or one or more subcarriers.

In an embodiment, a configured bandwidth unit is activated by a network device via an MAC CE or downlink control information (DCI), and an activated configured bandwidth unit is a scheduling bandwidth resource.

In an embodiment, at least one configured bandwidth unit is activated by the network device via an MAC CE or downlink control information, and the activated at least one bandwidth unit is a scheduling bandwidth resource.

In an embodiment, the resource scheduling information indicates at least one resource scheduling unit scheduled by the network device; wherein a resource in the scheduled at least one resource scheduling unit belonging to the scheduling bandwidth resource is used to determine the size of the transmission block; or, a resource of the at least one scheduled resource scheduling unit overlapping the scheduling bandwidth resource is used to determine a size of a transport block.

It should be noted that FIG. 16 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 16.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the indication information transmitted by the network device, and receives the resource scheduling information transmitted by the network device, the indication information being used to determine whether a spacing bandwidth resource belongs to a scheduling bandwidth resource; and determines a size of a transport block according to the indication information and the resource scheduling information. Hence, the network device and the terminal equipment may reach a consensus on spectrum resources, and resource utilization may be effectively improved.

Embodiment 3

The embodiments of this disclosure provide a resource determination apparatus. The apparatus may be, for example, a terminal equipment, or may be one or more components or assemblies configured in a terminal equipment. Contents in the embodiments identical to those in Embodiment 1 shall not be described herein any further.

Figure 17:
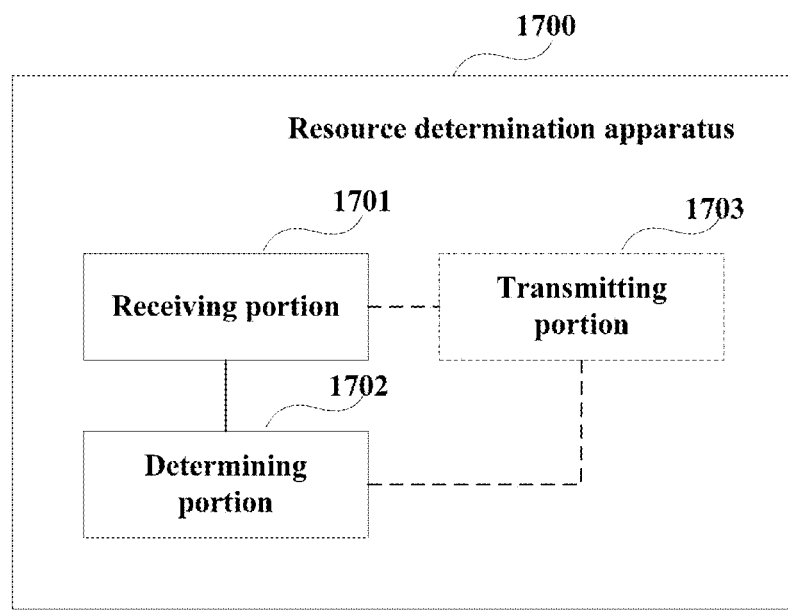
FIG. 17 is a schematic diagram of the resource determination apparatus of an embodiment of this disclosure.

FIG. 17 is a schematic diagram of the resource determination apparatus of the embodiment of this disclosure. As shown in FIG. 17, a resource determination apparatus 1700 includes:

a receiving portion 1701 configured to receive indication information transmitted by a network device, and receive resource scheduling information transmitted by the network device, the indication information being used to determine whether a spacing bandwidth resource belongs to a scheduling bandwidth resource; and a determining portion 1702 configured to determine a size of a transport block according to the indication information and the resource scheduling information.

In an embodiment, the spacing bandwidth resource is one or more resource units between at least two bandwidth units configured in a bandwidth part, or the spacing bandwidth resource is one or more resource units other than at least one bandwidth unit configured in a bandwidth part.

In an embodiment, the indication information indicates the scheduling bandwidth resource, and the determining portion 1702 further determines whether the spacing bandwidth resource belongs to the scheduling bandwidth resource according to the scheduling bandwidth resource.

In an embodiment, the indication information indicates whether the network device and/or a terminal equipment adjust(s) a size of the scheduling bandwidth resource by using a channel idle detection result.

In an embodiment, the indication information is transmitted via at least one of radio resource control signaling, a media access control control element, downlink control information.

In an embodiment, in a case where the indication information indicates that the network device and/or a terminal equipment do(es) not adjust a size of the scheduling bandwidth resource by using a channel idle detection result, the determining portion 1702 determines that a spacing bandwidth resource between two adjacent bandwidth units scheduled by the network device belongs to the scheduling bandwidth resource.

In an embodiment, in a case where the indication information indicates that the network device and/or a terminal equipment adjust(s) a size of the scheduling bandwidth resource by using a channel idle detection result, the determining portion 1702 determines that a spacing bandwidth resource between two adjacent bandwidth units is not scheduled by the network device.

In an embodiment, as shown in FIG. 17, the resource determination apparatus 1700 may further include:

a transmitting portion 1703 configured to report ability information to the network device, the ability information at least indicating whether the terminal equipment has an ability to adjust a size of a scheduling bandwidth resource according to a channel idle detection result.

In an embodiment, at least one bandwidth unit is configured in a bandwidth part configured for the terminal equipment.

In an embodiment, the bandwidth part is further configured with information indicating a starting resource block and the number of resource blocks of the bandwidth part, one or more resource blocks not belonging to the bandwidth unit in the bandwidth part being taken as the spacing bandwidth resource.

In an embodiment, one or more resource blocks included in the bandwidth unit is/are taken as one or more resource blocks of the bandwidth part, and one or more resource blocks out of the bandwidth unit is/are taken as the spacing bandwidth resource.

In an embodiment, the bandwidth unit is configured with information indicating a starting resource block and the number of resource blocks, or the bandwidth unit is configured with information on a starting resource block;

and at least two bandwidth units configured in the bandwidth part are able to contain at least one identical resource block, or any two bandwidth units configured in the bandwidth part do not contain identical resource blocks.

In an embodiment, a plurality of resource units of which a frequency-domain spacing is a predetermined value in the bandwidth part are divided into one resource scheduling unit;

or, at least one bandwidth unit in the bandwidth part is respectively divided into resource scheduling units, and a plurality of resource units of which a frequency-domain spacing is a predetermined value in one of the bandwidth units are divided into one resource scheduling unit.

In an embodiment, the resource unit is one or more resource blocks, or one or more resource block groups, or one or more subcarriers.

In an embodiment, a configured bandwidth unit is activated by the network device via a media access control control element or downlink control information, the configured bandwidth unit that is activated is the scheduling bandwidth resource.

In an embodiment, at least one configured bandwidth unit is activated by the network device via a media access control control element or downlink control information, the at least one activated bandwidth unit is the scheduling bandwidth resource.

In an embodiment, the resource scheduling information indicates at least one resource scheduling unit scheduled by the network device; wherein a resource belonging to the scheduling bandwidth resource in the at least one scheduled resource scheduling unit is used to determine a size of the transmission block, or a resource in the at least one scheduled resource scheduling unit overlapping with the scheduling bandwidth resource is used to determine a size of the transport block.

It should be noted that the components or modules related to this disclosure are only described above. However, this disclosure is not limited thereto, and the resource determination apparatus 1700 may further include other components or modules, and reference may be made to related techniques for particulars of these components or modules.

Furthermore, for the sake of simplicity, connection relationships between the components or modules or signal profiles thereof are only illustrated in FIG. 17. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the indication information transmitted by the network device, and receives the resource scheduling information transmitted by the network device, the indication information being used to determine whether a spacing bandwidth resource belongs to a scheduling bandwidth resource;

and determines a size of a transport block according to the indication information and the resource scheduling information. Hence, the network device and the terminal equipment may reach a consensus on spectrum resources, and resource utilization may be effectively improved.

Embodiment 4

The embodiments of this disclosure provide a resource scheduling apparatus. The apparatus may be, for example, a network device, or may be one or more components or assemblies configured in a network device. Contents in the embodiments identical to those in embodiments 1 and 2 shall not be described herein any further.

Figure 18:
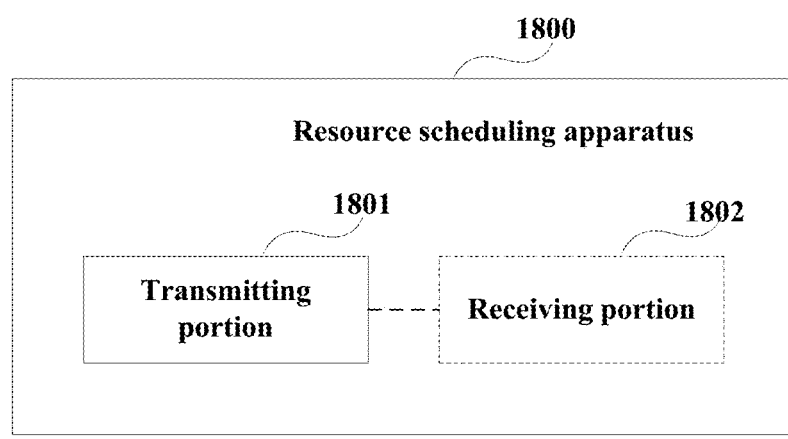
FIG. 18 is a schematic diagram of the resource scheduling apparatus of an embodiment of this disclosure.

FIG. 18 is a schematic diagram of the resource scheduling apparatus of the embodiment of this disclosure. As shown in FIG. 18, a resource scheduling apparatus 1800 includes:

a transmitting portion 1801 configured to transmit indication information to a terminal equipment, the indication information being used by the terminal equipment to determine whether a spacing bandwidth resource belongs to a scheduling bandwidth resource, the transmitting portion 1801 further transmitting resource scheduling information to the terminal equipment, and the indication information and the resource scheduling information being at least used by the terminal equipment to determine a size of a transport block.

As shown in FIG. 18, the resource scheduling apparatus 1800 may further include:

a receiving portion 1802 configured to receive ability information reported by the terminal equipment, the ability information at least indicating whether the terminal equipment has an ability to adjust a size of a scheduling bandwidth resource according to a channel idle detection result.

It should be noted that the components or modules related to this disclosure are only described above. However, this disclosure is not limited thereto, and the resource scheduling apparatus 1800 may further include other components or modules, and reference may be made to related techniques for particulars of these components or modules.

Furthermore, for the sake of simplicity, connection relationships between the components or modules or signal profiles thereof are only illustrated in FIG. 18. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the indication information transmitted by the network device, and receives the resource scheduling information transmitted by the network device, the indication information being used to determine whether a spacing bandwidth resource belongs to a scheduling bandwidth resource; and determines a size of a transport block according to the indication information and the resource scheduling information. Hence, the network device and the terminal equipment may reach a consensus on spectrum resources, and resource utilization may be effectively improved.

Embodiment 5

The embodiments of this disclosure provide a communication system, and reference may be made to FIG. 2, with contents identical to those in embodiments 1-4 being not going to be described herein any further. In an embodiment, the communication system 100 may include:

a terminal equipment 102 configured to receive indication information transmitted by a network device 101, the indication information being used to determine whether a spacing bandwidth resource belongs to a scheduling bandwidth resource; receive resource scheduling information transmitted by the network device 101; and determine a size of a transport block according to the indication information and the resource scheduling information; and the network device 101 configured to transmit the indication information and the resource scheduling information to the terminal equipment 102.

The embodiment of this disclosure further provides a network device, which may be, for example, a base station. However, this disclosure is not limited thereto, and it may also be another network device.

Figure 19:
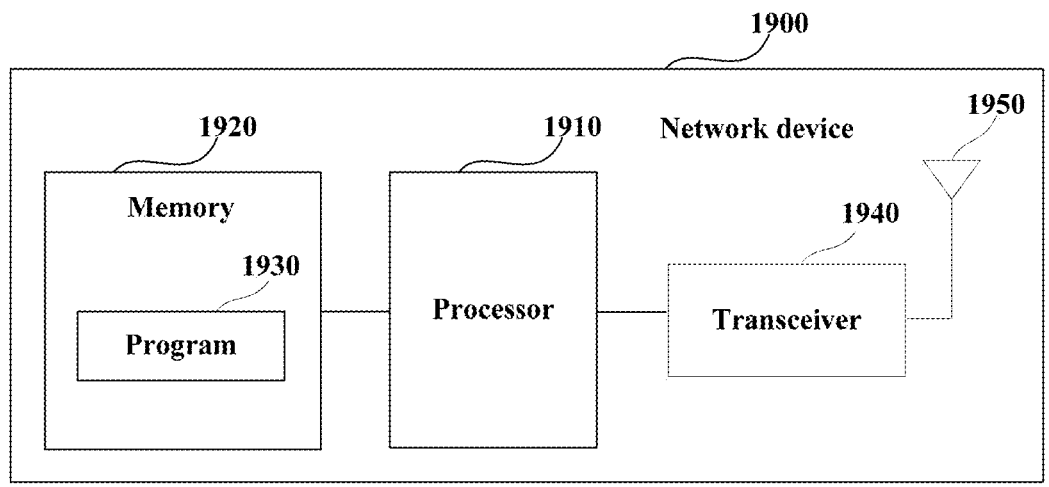
FIG. 19 is a schematic diagram of the network device of an embodiment of this disclosure.

FIG. 19 is a schematic diagram of a structure the network device of the embodiment of this disclosure. As shown in FIG. 19, a network device 1900 may include a processor 1910 (such as a central processing unit (CPU)) and a memory 1920, the memory 1920 being coupled to the processor 1910. The memory 1920 may store various data, and furthermore, it may store a program 1930 for data processing, and execute the program 1930 under control of the processor 1910.

For example, the processor 1910 may be configured to execute a program to carry out the resource scheduling method described in Embodiment 2. For example, the processor 1910 may be configured to perform the following control: transmitting indication information to a terminal equipment, the indication information being used by the terminal equipment to determine whether a spacing bandwidth resource belongs to a scheduling bandwidth resource; and transmitting resource scheduling information to the terminal equipment, the indication information and the resource scheduling information being at least used by the terminal equipment to determine a size of a transport block.

Furthermore, as shown in FIG. 19, the network device 1900 may include a transceiver 1940, and an antenna 1950, etc. Functions of the above components are similar to those in the relevant art, and shall not be described herein any further. It should be noted that the network device 1900 does not necessarily include all the parts shown in FIG. 19, and furthermore, the network device 1900 may include parts not shown in FIG. 19, and the relevant art may be referred to.

The embodiment of this disclosure further provides a terminal equipment; however, this disclosure is not limited thereto, and it may also be another equipment.

Figure 20:
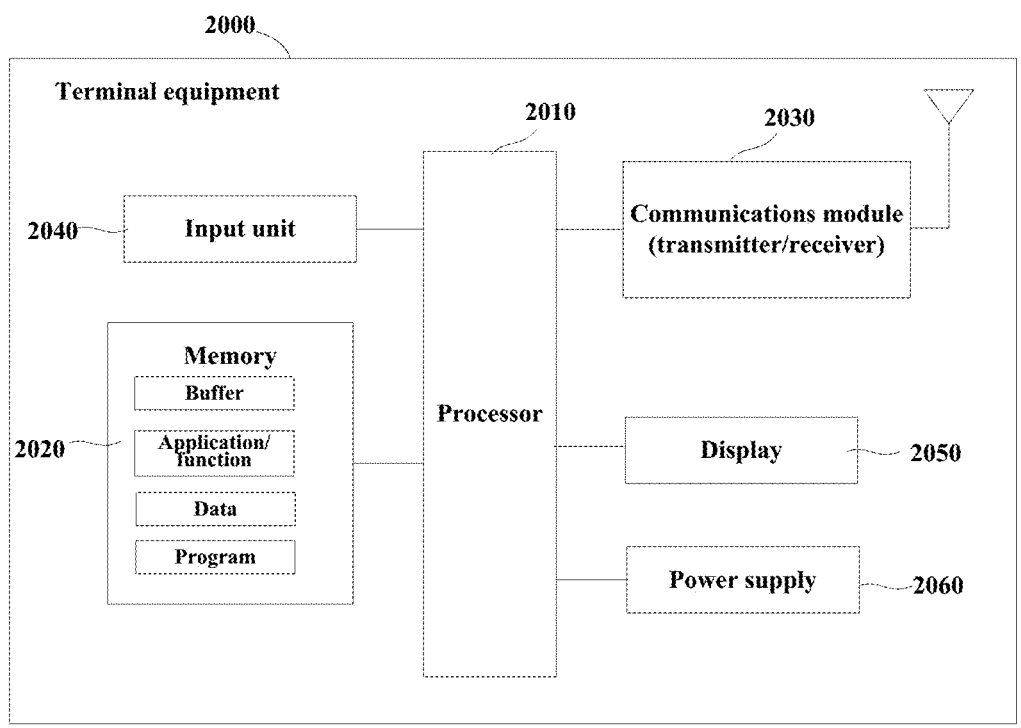
FIG. 20 is a schematic diagram of the terminal equipment of an embodiment of this disclosure.

FIG. 20 is a schematic diagram of the terminal equipment of the embodiment of this disclosure. As shown in FIG. 20, a terminal equipment 2000 may include a processor 2010 and a memory 2020, the memory 2020 storing data and a program and being coupled to the processor 2010. It should be noted that this figure is illustrative only, and other types of structures may also be used, so as to supplement or replace this structure and achieve a telecommunications function or other functions.

For example, the processor 2010 may be configured to execute a program to carry out the resource determination method as described in Embodiment 1. For example, the processor 2010 may be configured to perform the following control: receiving indication information transmitted by a network device, the indication information being used to determine whether a spacing bandwidth resource belongs to a scheduling bandwidth resource; receiving resource scheduling information transmitted by the network device; and determining a size of a transport block according to the indication information and the resource scheduling information.

As shown in FIG. 20, the terminal equipment 2000 may further include a communication module 2030, an input unit 2040, a display 2050, and a power supply 2060; wherein functions of the above components are similar to those in the relevant art, which shall not be described herein any further. It should be noted that the terminal equipment 2000 does not necessarily include all the parts shown in FIG. 20, and the above components are not necessary. Furthermore, the terminal equipment 2000 may include parts not shown in FIG. 20, and the relevant art may be referred to.

An embodiment of this disclosure provides a computer program, which, when executed in a terminal equipment, will cause the terminal equipment to carry out the resource determination method as described in Embodiment 1.

An embodiment of this disclosure provides a storage medium, including a computer program, which will cause a terminal equipment to carry out the resource determination method as described in Embodiment 1.

An embodiment of this disclosure provides a computer program, which, when executed in a network device, will cause the network device to carry out the resource scheduling method as described in Embodiment 2.

An embodiment of this disclosure provides a storage medium, including a computer program, which will cause a network device to carry out the resource scheduling method as described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

As to implementations containing the above embodiments, following supplements are further disclosed.

Supplement 1. A resource determination method, including:

receiving, by a terminal equipment, indication information transmitted by a network device, the indication information being used to determine whether a spacing bandwidth resource belongs to a scheduling bandwidth resource;

receiving, by the terminal equipment, resource scheduling information transmitted by the network device; and determining a size of a transport block by the terminal equipment according to the indication information and the resource scheduling information.

Supplement 2. The method according to supplement 1, wherein the spacing bandwidth resource is one or more resource units between at least two bandwidth units configured in a bandwidth part (BWP), or the spacing bandwidth resource is one or more resource units other than at least one bandwidth unit configured in a bandwidth part (BWP).

Supplement 3. The method according to supplement 1 or 2, wherein the indication information indicates the scheduling bandwidth resource, and the terminal equipment determines whether the spacing bandwidth resource belongs to the scheduling bandwidth resource according to the scheduling bandwidth resource.

Supplement 4. The method according to any one of supplements 1-3, wherein the indication information indicates whether the network device and/or the terminal equipment adjust(s) a size of the scheduling bandwidth resource by using a channel idle detection result.

Supplement 5. The method according to any one of supplements 1-4, wherein the indication information is transmitted via at least one of radio resource control (RRC) signaling, a media access control (MAC) control element (CE), downlink control information (DCI).

Supplement 6. The method according to any one of supplements 1-5, wherein in a case where the indication information indicates that the network device and/or a terminal equipment do(es) not adjust a size of the scheduling bandwidth resource by using a channel idle detection result, the terminal equipment determines that a spacing bandwidth resource between two adjacent bandwidth units scheduled by the network device belongs to the scheduling bandwidth resource.

Supplement 7. The method according to any one of supplements 1-5, wherein in a case where the indication information indicates that the network device and/or a terminal equipment adjust(s) a size of the scheduling bandwidth resource by using a channel idle detection result, the terminal equipment determines that a spacing bandwidth resource between two adjacent bandwidth units is not scheduled by the network device.

Supplement 8. The method according to any one of supplements 1-7, wherein the method further includes:

reporting ability information by the terminal equipment to the network device, the ability information at least indicating whether the terminal equipment has an ability to adjust a size of a scheduling bandwidth resource according to a channel idle detection result.

Supplement 9. The method according to any one of supplements 1-8, wherein at least one bandwidth unit is configured in a bandwidth part (BWP) configured for the terminal equipment.

Supplement 10. The method according to supplement 9, wherein the bandwidth part (BWP) is further configured with information indicating a starting resource block and the number of resource blocks of the bandwidth part, one or more resource blocks not belonging to the bandwidth unit in the bandwidth part being taken as the spacing bandwidth resource.

Supplement 11. The method according to supplement 9, wherein one or more resource blocks included in the bandwidth unit is/are taken as one or more resource blocks of the bandwidth part, and one or more resource blocks out of the bandwidth unit is/are taken as the spacing bandwidth resource.

Supplement 12. The method according to any one of supplements 9-11, wherein the bandwidth unit is configured with information indicating a starting resource block and the number of resource blocks, or the bandwidth unit is configured with information on a starting resource block;

and at least two bandwidth units configured in the bandwidth part are able to contain at least one identical resource block, or any two bandwidth units configured in the bandwidth part do not contain identical resource blocks.

Supplement 13. The method according to any one of supplements 9-12, wherein a plurality of resource units of which a frequency-domain spacing is a predetermined value in the bandwidth part (BWP) are divided into one resource scheduling unit;

or, at least one bandwidth unit in the bandwidth part (BWP) is respectively divided into resource scheduling units, and a plurality of resource units of which a frequency-domain spacing is a predetermined value in one of the bandwidth units are divided into one resource scheduling unit.

Supplement 14. The method according to any one of supplements 9-13, wherein the resource unit is one or more resource blocks, or one or more resource block groups, or one or more subcarriers.

Supplement 15. The method according to any one of supplements 9-14, wherein a configured bandwidth unit is activated by the network device via an MAC CE or downlink control information (DCI), the configured bandwidth unit that is activated is the scheduling bandwidth resource.

Supplement 16. The method according to any one of supplements 9-14, wherein at least one configured bandwidth unit is activated by the network device via an MAC CE or downlink control information, the at least one activated bandwidth unit is the scheduling bandwidth resource.

Supplement 17. The method according to any one of supplements 9-16, wherein the resource scheduling information indicates at least one resource scheduling unit scheduled by the network device;

wherein a resource belonging to the scheduling bandwidth resource in the at least one scheduled resource scheduling unit is used to determine a size of the transmission block, or a resource in the at least one scheduled resource scheduling unit overlapping with the scheduling bandwidth resource is used to determine a size of the transport block.

Supplement 18. A resource scheduling method, including:
transmitting indication information by a network device to a terminal equipment, the indication information being used by the terminal equipment to determine whether a spacing bandwidth resource belongs to a scheduling bandwidth resource, transmitting resource scheduling information by the network device to the terminal equipment, and the indication information and the resource scheduling information being at least used by the terminal equipment to determine a size of a transport block.

Supplement 19. The method according to supplement 18, wherein the spacing bandwidth resource is one or more resource units between at least two bandwidth units configured in a bandwidth part (BWP), or the spacing bandwidth resource is one or more resource units other than at least one bandwidth unit configured in a bandwidth part (BWP).

Supplement 20. The method according to supplement 18 or 19, wherein the indication information indicates the scheduling bandwidth resource, and the terminal equipment determines whether the spacing bandwidth resource belongs to the scheduling bandwidth resource according to the scheduling bandwidth resource. Supplement 21. The method according to any one of supplements 18-20, wherein the indication information indicates whether the network device and/or the terminal equipment adjust(s) a size of the scheduling bandwidth resource by using a channel idle detection result.

Supplement 22. The method according to any one of supplements 18-21, wherein the indication information is transmitted via at least one of radio resource control (RRC) signaling, a media access control (MAC) control element (CE), downlink control information (DCI).

Supplement 23. The method according to any one of supplements 18-22, wherein in a case where the indication information indicates that the network device and/or a terminal equipment do(es) not adjust a size of the scheduling bandwidth resource by using a channel idle detection result, the terminal equipment determines that a spacing bandwidth resource between two adjacent bandwidth units scheduled by the network device belongs to the scheduling bandwidth resource.

Supplement 24. The method according to any one of supplements 18-22, wherein in a case where the indication information indicates that the network device and/or a terminal equipment adjust(s) a size of the scheduling bandwidth resource by using a channel idle detection result, the terminal equipment determines that a spacing bandwidth resource between two adjacent bandwidth units is not scheduled by the network device.

Supplement 25. The method according to any one of supplements 18-24, wherein the method further includes:
receiving, by the network device, ability information reported by the terminal equipment, the ability information at least indicating whether the terminal equipment has an ability to adjust a size of a scheduling bandwidth resource according to a channel idle detection result.

Supplement 26. The method according to any one of supplements 18-25, wherein at least one bandwidth unit is configured in a bandwidth part (BWP) configured for the terminal equipment.

Supplement 27. The method according to supplement 26, wherein the bandwidth part (BWP) is further configured with information indicating a starting resource block and the number of resource blocks of the bandwidth part, one or more resource blocks not belonging to the bandwidth unit in the bandwidth part being taken as the spacing bandwidth resource.

Supplement 28. The method according to supplement 26, wherein one or more resource blocks included in the bandwidth unit is/are taken as one or more resource blocks of the bandwidth part, and one or more resource blocks out of the bandwidth unit is/are taken as the spacing bandwidth resource.

Supplement 29. The method according to any one of supplements 26-28, wherein the bandwidth unit is configured with information indicating a starting resource block and the number of resource blocks, or the bandwidth unit is configured with information on a starting resource block;

and at least two bandwidth units configured in the bandwidth part (BWP) are able to contain at least one identical resource block, or any two bandwidth units configured in the bandwidth part (BWP) do not contain identical resource blocks.

Supplement 30. The method according to any one of supplements 26-29, wherein a plurality of resource units of which a frequency-domain spacing is a predetermined value in the bandwidth part (BWP) are divided into one resource scheduling unit;

or, at least one bandwidth unit in the bandwidth part (BWP) is respectively divided into resource scheduling units, and a plurality of resource units of which a frequency-domain spacing is a predetermined value in one of the bandwidth units are divided into one resource scheduling unit.

Supplement 31. The method according to any one of supplements 26-30, wherein the resource unit is one or more resource blocks, or one or more resource block groups, or one or more subcarriers.

Supplement 32. The method according to any one of supplements 26-31, wherein a configured bandwidth unit is activated by the network device via an MAC CE or downlink control information (DCI), the configured bandwidth unit that is activated is the scheduling bandwidth resource.

Supplement 33. The method according to any one of supplements 26-31, wherein at least one configured bandwidth unit is activated by the network device via an MAC CE or downlink control information, the at least one activated bandwidth unit is the scheduling bandwidth resource.

Supplement 34. The method according to any one of supplements 26-33, wherein the resource scheduling information indicates at least one resource scheduling unit scheduled by the network device;

wherein a resource belonging to the scheduling bandwidth resource in the at least one scheduled resource scheduling unit is used to determine a size of the transmission block, or a resource in the at least one scheduled resource scheduling unit overlapping with the scheduling bandwidth resource is used to determine a size of the transport block.

Supplement 35. A terminal equipment, including a memory and a processor, the memory storing a computer program, and the processor being configured to execute the computer program to carry out the resource determination method as described in any one of supplements 1-17.

Supplement 36. A network device, including a memory and a processor, the memory storing a computer program, and the processor being configured to execute the computer program to carry out the resource scheduling method as described in any one of supplements 18-34.

What is claimed is:

1. A resource determination apparatus, comprising:
a memory that stores a plurality of instructions; and
processor circuitry that couples to the memory and is configured to execute the instructions to:
receive indication information transmitted by a network device, the indication information being used to determine whether a spacing bandwidth resource belongs to a scheduling bandwidth resource;
receive resource scheduling information transmitted by the network device;
determine resource allocation in frequency domain as
an intersection of resource blocks of scheduled interlaces indicated by the resource scheduling information, and
a union of: scheduled bandwidth unit(s) indicated by the indication information; and spacing bandwidth resource(s) between the scheduled bandwidth unit(s); and
determine a size of a transport block according to the resource allocation in frequency domain.

2. The apparatus according to claim 1, wherein the spacing bandwidth resource is one or more resource units between at least two bandwidth units configured in a bandwidth part, or the spacing bandwidth resource is one or more resource units other than at least one bandwidth unit configured in a bandwidth part.

3. The apparatus according to claim 1, wherein the indication information indicates the scheduling bandwidth resource, and the processor circuitry further determines whether the spacing bandwidth resource belongs to the scheduling bandwidth resource according to the scheduling bandwidth resource.

4. The apparatus according to claim 1, wherein the indication information indicates whether the network device and/or a terminal equipment adjust(s) a size of the scheduling bandwidth resource by using a channel idle detection result.

5. The apparatus according to claim 1, wherein the indication information is transmitted via at least one of radio resource control signaling, a media access control control element, downlink control information.

6. The apparatus according to claim 1, wherein in a case where the indication information indicates that the network device and/or a terminal equipment do(es) not adjust a size of the scheduling bandwidth resource by using a channel idle detection result, the processor circuitry determines that a spacing bandwidth resource between two adjacent bandwidth units scheduled by the network device belongs to the scheduling bandwidth resource;

in a case where the indication information indicates that the network device and/or a terminal equipment adjust(s) a size of the scheduling bandwidth resource by using a channel idle detection result, the processor circuitry determines that a spacing bandwidth resource between two adjacent bandwidth units is not scheduled by the network device.

7. The apparatus according to claim 1, wherein the processor circuitry is
configured to report ability information to the network device, the ability information at least indicating whether a terminal equipment has an ability to adjust a size of a scheduling bandwidth resource according to a channel idle detection result.

8. The apparatus according to claim 1, wherein at least one bandwidth unit is configured in a bandwidth part configured for the terminal equipment.

9. The apparatus according to claim 8, wherein the bandwidth part is further configured with information indicating a starting resource block and the number of resource blocks of the bandwidth part, one or more resource blocks not belonging to the bandwidth unit in the bandwidth part being taken as the spacing bandwidth resource.

10. The apparatus according to claim 8, wherein one or more resource blocks included in the bandwidth unit is/are taken as one or more resource blocks of the bandwidth part, and one or more resource blocks out of the bandwidth unit is/are taken as the spacing bandwidth resource.

11. The apparatus according to claim 8, wherein the bandwidth unit is configured with information indicating a starting resource block and the number of resource blocks, or the bandwidth unit is configured with information on a starting resource block;
at least two bandwidth units configured in the bandwidth part are able to contain at least one identical resource block, or any two bandwidth units configured in the bandwidth part do not contain identical resource blocks.

12. The apparatus according to claim 8, wherein a plurality of resource units of which a frequency-domain spacing is a predetermined value in the bandwidth part are divided into one resource scheduling unit;
or, at least one bandwidth unit in the bandwidth part is respectively divided into resource scheduling units, and a plurality of resource units of which a frequency-domain spacing is a predetermined value in one of the bandwidth units are divided into one resource scheduling unit.

13. The apparatus according to claim 8, wherein one resource unit is a unit of:
one or more resource blocks,
one or more resource block groups, or
one or more subcarriers.

14. The apparatus according to claim 8, wherein a configured bandwidth unit is activated by the network device via a media access control control element or downlink control information, the configured bandwidth unit that is activated is the scheduling bandwidth resource.

15. The apparatus according to claim 8, wherein at least one configured bandwidth unit is activated by the network device via a media access control control element or downlink control information, the at least one activated bandwidth unit is the scheduling bandwidth resource.

16. The apparatus according to claim 8, wherein the resource scheduling information indicates at least one resource scheduling unit scheduled by the network device;
wherein a resource belonging to the scheduling bandwidth resource in the at least one scheduled resource scheduling unit is used to determine a size of the transmission block, or a resource in the at least one scheduled resource scheduling unit overlapping with the scheduling bandwidth resource is used to determine a size of the transport block.

17. A resource scheduling apparatus, comprising:
a transmitter configured to:
transmit indication information to a terminal equipment, the indication information being used by the terminal equipment to determine whether a spacing bandwidth resource belongs to a scheduling bandwidth resource, and
transmit resource scheduling information to the terminal equipment,
wherein resource allocation in frequency domain is determined by the terminal equipment as
an intersection of resource blocks of scheduled interfaces indicated by the resource scheduling information, and
a union of: scheduled bandwidth unit(s) indicate oy the indication information; and spacing bandwidth resources between the scheduled bandwidth unit(s), and
the resource allocation in frequency domain is used by the terminal equipment to determine a size of a transport block.

18. The apparatus according to claim 17, wherein the apparatus further comprises:
a receiver configured to receive ability information reported by the terminal equipment, the ability information at least indicating whether the terminal equipment has an ability to adjust a size of a scheduling bandwidth resource according to a channel idle detection result.

19. A communication system, comprising:
a network device configured to transmit indication information and resource scheduling information; and
a terminal equipment configured to:
receive the indication information transmitted by the network device, the indication information being used to determine whether a spacing bandwidth resource belongs to a scheduling bandwidth resource;
receive the resource scheduling information transmitted by the network device;
determine resource allocation in frequency domain as
an intersection of resource blocks of scheduled interlaces indicated by the resource scheduling information, and
a union of: scheduled bandwidth unit(s) indicated by the indication information; and spacing bandwidth resource(s) between the scheduled bandwidth unit(s), and
determine a size of a transport block according to the resource allocation in frequency domain.

\* \* \* \* \*